Dec. 4, 1945. O. J. POUPITCH 2,390,121
METHOD AND MACHINE FOR ASSEMBLING WASHERS
WITH SCREW THREADED FASTENERS
Filed April 17, 1942 5 Sheets-Sheet 1
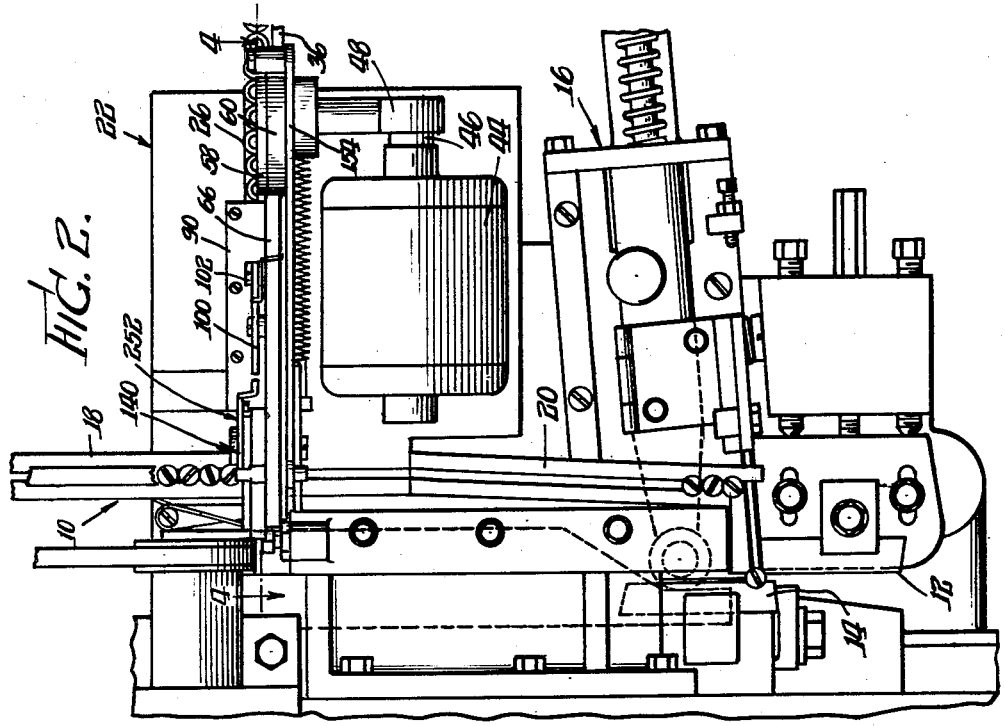
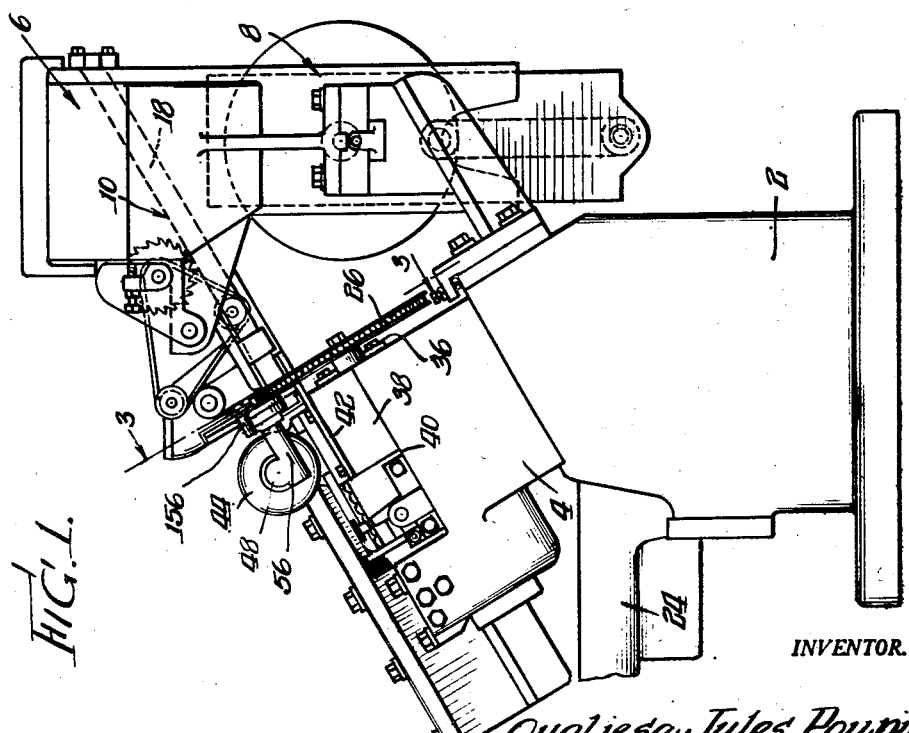
INVENTOR.
Ougljesa Jules Poupitch
By:- Cox Moore & Olson attys

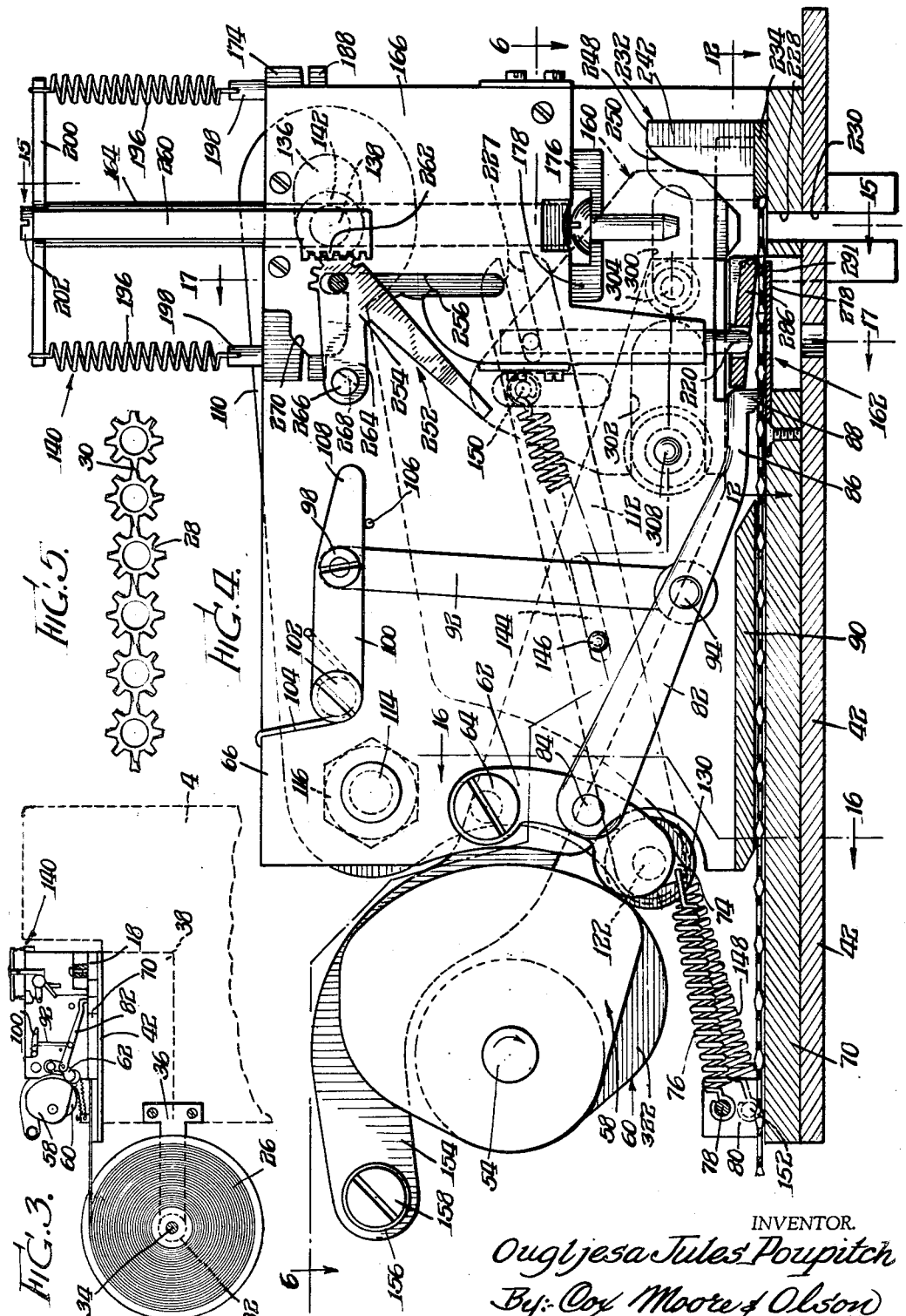

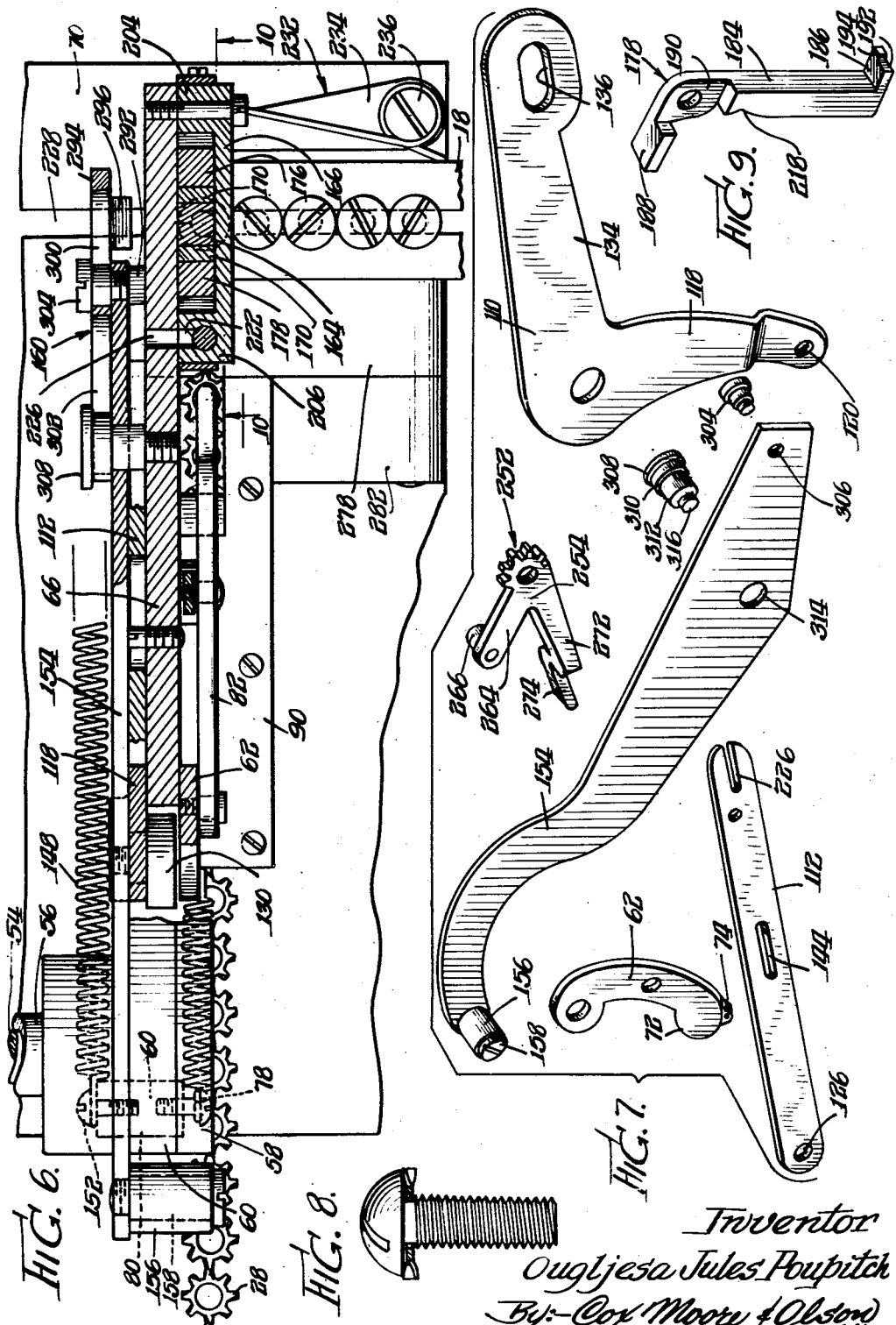

Dec. 4, 1945.  O. J. POUPITCH  2,390,121
METHOD AND MACHINE FOR ASSEMBLING WASHERS
WITH SCREW THREADED FASTENERS
Filed April 17, 1942  5 Sheets-Sheet 4
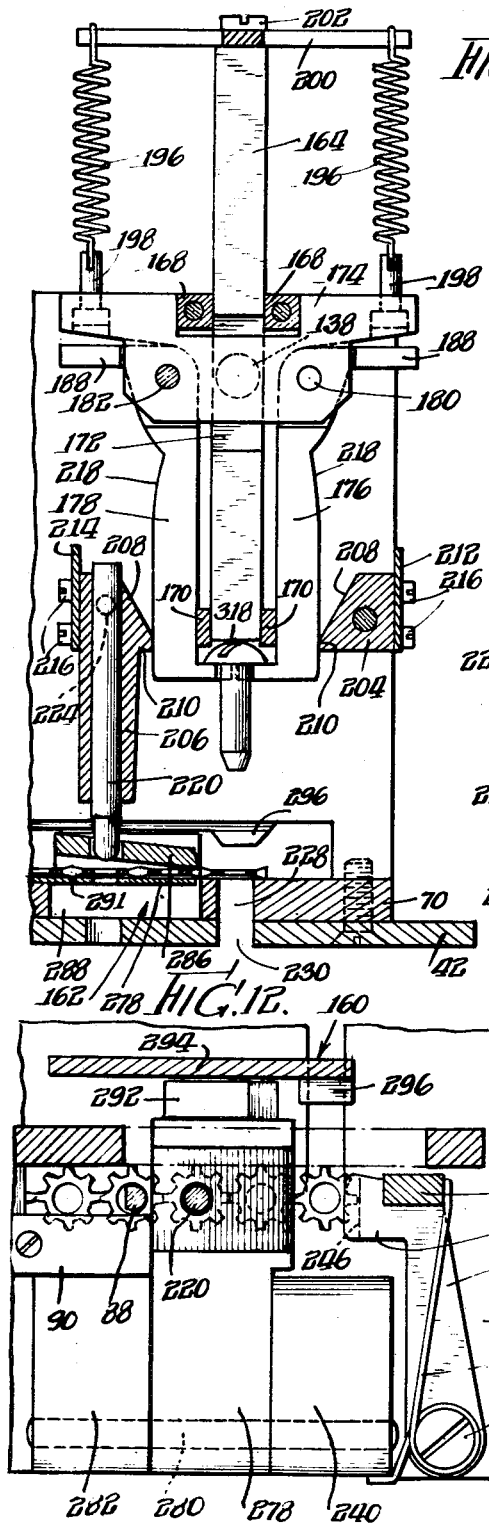
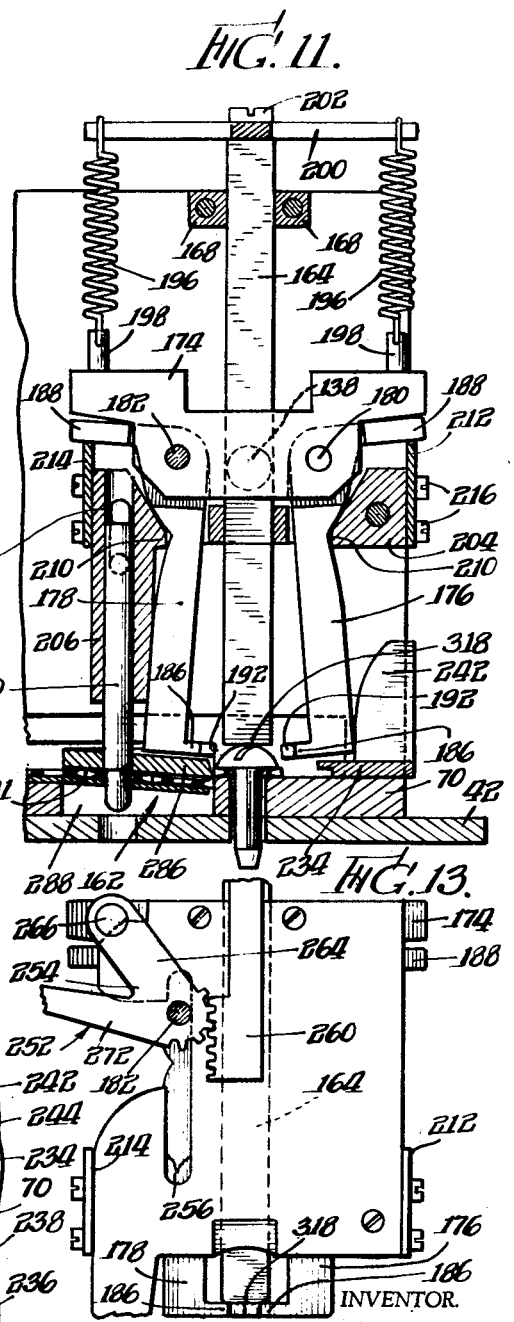
INVENTOR.
Ougljesa Jules Poupitch
By:- Cox Moore & Olson
attys

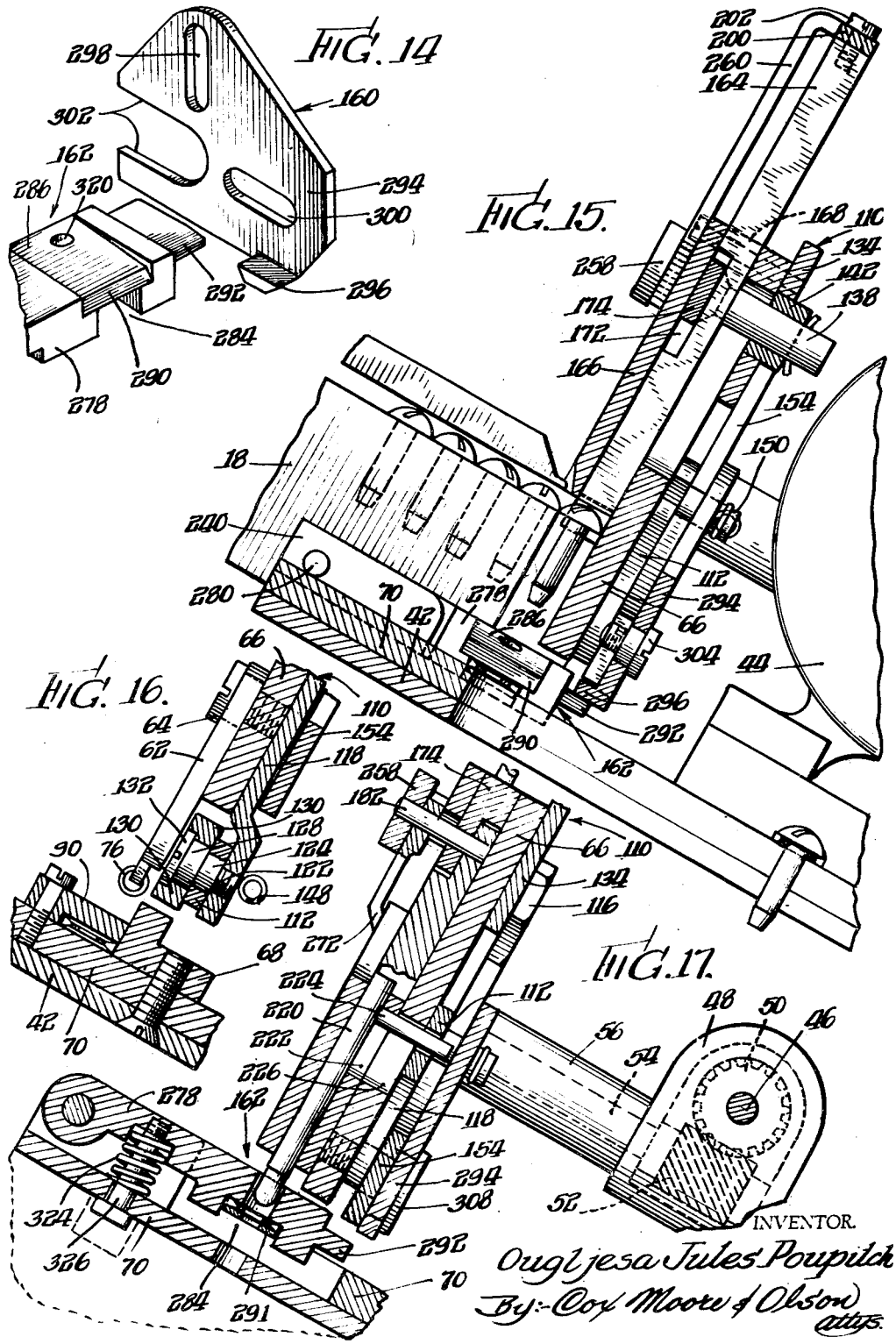

Patented Dec. 4, 1945

2,390,121

UNITED STATES PATENT OFFICE 2,390,121

METHOD AND MACHINE FOR ASSEMBLING WASHERS WITH SCREW-THREADED FASTENERS

Ougljesa Jules Poupitch, Chicago, Ill., assignor to Illinois Tool Works, Chicago, Ill., a corporation of Illinois Application April 17, 1942, Serial No. 439,380

19 Claims. (Cl. 10—155.5)

This invention relates to a method and machine for producing, as an article of manufacture, a unit assembly of a threaded fastener and a washer, particularly a screw and lock washer.

It is an object of this invention to devise a more efficient and simplified, high speed method and machine for assembling fastener elements with washers.

A further object of the invention is to provide a method and machine by which a strip composed of washers in adjoined but readily severable relation is fed to an assembly point; threaded fasteners are brought to this point, telescoped with the washers; and the telescoped washers detached or severed from this strip.

The invention contemplates the provision of a method of producing, as an article of manufacture, a unit assembly of a fastener element, such as a screw or nut, and a washer, in which a strip comprising adjoined but readily severable washers is fed from a roll to a predetermined point at which a fastener or screw element is telescoped with a washer, the telescoped washer detached or punched from the strip and the fastener elements of these temporarily assembled units subjected to an enlarging or other upsetting operation to retain the fastener elements or screw and washers in permanently assembled relation.

Another object of the invention is to provide a machine for feeding a band of washers from a roll to an assembly station, at which screw elements are inserted in the washers and the washers then cut from the band.

It is a further object of applicant's invention to provide a simplified method and mechanism intermittently so feeding a strip of marginally joined, readily severable washers as to position the washers successively at a predetermined point while in timed relation selecting a screw element from its feeding means, inserting the element in the foremost washer of the strip, and holding the screw element and the telescoped washer against movement while applying transverse pressure to the strip, preferably at or adjacent the point of marginal connection between the foremost and following washer, to sever the telescoped washer from the strip.

It is also an object of the invention to provide a unitary mechanism or machine which may be attached to a known machine having a screw element feeding device or chute so as to feed a band of washers to the device or chute, assemble the screw elements with the washers, and then detach the washers from the band.

A more specific object of my invention is to provide a screw forming machine, preferably a thread rolling machine, by which a strip of washers is fed from a roll across a chute; screw elements telescoped with the washers while the washers are over the chute; the telescoped washers severed from the strip, and the assemblies fed by the chute to a screw forming or thread rolling device which so forms the screw or thread thereon as to retain the washers on the screw elements.

High speed instrumentalities for feeding washers or the like with which I am familiar, include one or more devices which rely on the agitation of the washers to cause them to be positioned in a predetermined manner in or on a feeding element, and therefore more or less frequently fail to feed a washer to the desired point or device. Other instrumentalities for that purpose are of relatively low speed, and for that reason unsatisfactory for high speed production methods or machines. It is accordingly an important object of my invention to provide a method and mechanism by which washers or the like may be fed in predetermined order and position to the desired point without such failure of delivery and at speeds consistent with the maximum speed of the production method, or with the maximum speed of other devices to which such feed mechanism may deliver the washers.

My invention further contemplates the provision of means to feed a strip of adjoined washers along or through a guide which, when the foremost washer reaches a discharge point, is shifted to press upon the strip being fed sufficiently to separate the next following washer from the foremost washer thereby to discharge the foremost washer from the strip.

Other objects and advantages of the invention will be apparent from the following description when taken in connection with the accompanying drawings, wherein—

Figure 1 is a view in vertical elevation of a machine embodying the invention;

Figure 2 is a fragmentary plan view of the machine of Figure 1;

Figure 3 is a fragmentary view in inclined vertical section taken substantially along the line 3—3 of Figure 1;

Figure 4 is a fragmentary view in inclined vertical section taken substantially along the line 4—4 of Figure 2;

Figure 5 is a fragmentary plan view of the washer strip;

Figure 6 is a fragmentary view in generally horizontal section taken substantially along the line 6—6 of Figure 5;

Figure 7 is an exploded view in perspective of certain operating elements of the machine;

Figure 8 is a view in vertical elevation of a screw and washer assembly unit produced by the machine;

Figure 9 is a view in perspective of one of two similar screw clamping jaws;

Figure 10 is a fragmentary view in generally vertical section taken substantially along the line 10—10 of Figure 6;

Figure 11 is a view similar to Figure 10 showing the parts in a different position of operation;

Figure 12 is a fragmentary view in generally horizontal section taken substantially along the line 12—12 of Figure 4;

Figure 13 is a fragmentary view of a portion of the mechanism shown in Figure 4 but with the parts in a different position of operation;

Figure 14 is an exploded view in perspective of a guide and severing device for the washer strip;

Figure 15 is a fragmentary view in vertical section taken substantially along the line 15—15 of Figure 4;

Figure 16 is a fragmentary view in vertical section taken substantially along the line 16—16 of Figure 4; and Figure 17 is a fragmentary view in vertical section taken substantially along the line 17—17 of Figure 4.

As shown in the drawings, the machine which forms one embodiment of my invention includes as a part thereof a screw thread rolling machine of standard type, such as shown in Wilcox Patents No. 1,584,263 of May 11, 1926 and No. 1,798,919 of March 31, 1931. This screw thread rolling machine comprises a main base or pedestal 2; an auxiliary base or body 4 secured or formed integrally with the base 2 and inclined at an angle of approximately thirty degrees to the horizontal; a hopper 6 for receiving a mass of screw blanks; a screw blank feeding mechanism 8 for discharging blanks from the hopper 6 onto the guide chute 10; a pair of thread rolling dies 12 and 14; and a transfer mechanism 16.

The chute 10 is composed of an upper part 18 and a lower part 20 secured to the auxiliary base 4 and the frame of the washer hopper so as to extend in parallel, vertically spaced planes, the upper part serving to feed the screw elements in succession by gravity to a combined washer feed device and assembly mechanism 22 for assembly of the washers with screws, and the lower part serving to feed the assembled units in succession by gravity to transfer mechanism 16 by which they are fed laterally from the chute part 20, as seen in Figure 2, to the thread rolling dies 12 and 14. The thread rolling dies 12 and 14 are relatively reciprocable and in forming the screw thread beneath the washer, effect an enlargement or upsetting of the shank of the screw element, which enlargement or upset thread secures the washer permanently in position on the screw, as shown in Figure 8. The thread being formed as the die member 14 moves forwardly (in Figure 2) toward the lower end of the machine, as shown in Figure 1, the completed unit is discharged into a receptacle or pan 24 (Figure 1).

The washers are supplied to the machine from a roll 26 (Figures 1 and 3) which comprises a wound strip of lock washers 28, of which adjacent washers are adjoined as by integral, marginally connected toothed portions 30 formed as shown in my copending application, Serial No. 431,072, filed February 16, 1942. It will be evident that the wound strip may be composed of washers in other forms, such for example as internal tooth lock washers, of which the outer margins are marginally connected by limited areas (as shown in said copending application) so as to be readily severable.

The washer roll 26 which may be formed on a drum or axle 32 (Figure 3) is journaled on a rod or bolt 34 secured to a bracket 36, in turn fastened to the auxiliary base or body 4. A mounting block or base 38 for the washer feed and assembly mechanism may be mounted on a shelf or ledge 40 of the auxiliary base or body 4, and to this is bolted a mounting plate 42 supporting an electric motor or other suitable prime mover 44.

The motor shaft 46 (Figures 2 and 17) extends into a gear box 48 mounted in any convenient manner on the plate 42 and carries a gear 50 meshing with a gear 52 secured to a shaft 54 journaled in the gear box 48 and shaft housing 56. A pair of driving cams 58 and 60, best shown in Figures 3, 4 and 6, is secured to the outer end of the shaft 54. The cam 58 controls the movement of a lever 62 of the form shown in Figure 7 and pivoted at its upper end as by cap screw 64 (Figures 4 and 16) to an upstanding plate 66 having a lateral lower flange portion 68 bolted as shown in Figure 16 to the plate 42 and the plate 70 overlying a portion of the plate 42. The lever 62 is formed at its lower end with a rounded cam engaging follower surface 72 (Figure 7) to engage the surface of the cam 58, as shown in Figure 4. A lug 74 depends from the lower end of the lever 62 and receives one end of a spring 76 (Figure 4) secured at its opposite end to a pin or lug 78 of a block 80 fixed to the plate 70.

The lever 62 operates a floating lever 82 pivoted to the lever 62 as by pin 84. The lever 82 is provided with a free end portion 86 extending generally parallel to the surface of the plate 70 and terminating in a depending tooth 88 engaged in the central apertures of the washers of the strip which is fed thereby from the roll 26 across the surface of the plate 70, which may be hardened and smoothly finished for that purpose. The strip of washers is guided across the surface of the plate 70 by the forward face of the plate 66 and an L-shaped cover plate or guide 90 (Figures 4 and 16) bolted to the plate 70. The lever 82 is floatingly supported intermediate its ends on a vertical link 92 (Figure 4) to which it is pivoted as by pin 94. The link 92 is provided at its upper end with an aperture loosely receiving a pin or bolt 98 carried by lever 100 pivoted by a cap screw 102 to the plate 66.

A coil spring 104 wound about the screw 102 and having one end secured to the plate 66 and its other end secured to the lever 100, urges this lever in a clockwise direction, as seen in Figure 4, and against the limiting pin 106. The lever 100 is formed at its outer free end with an operating finger 108 which, as will later appear, is operated, when a screw blank is not presented for assembly, in a counterclockwise direction, thereby raising the link 92 and through it the lever 82 so as to prevent the lever 82 from engaging the washer strip.

The cam 60 controls the movement of a bellcrank 110 and a lever 112. The bellcrank 110 is pivoted to the plate 66 as by threaded stud 114 and nut 116 on the opposite side from the lever 62. The depending short arm 118 of the bellcrank 110 is provided with a threaded aperture 120 which receives the threaded end of a stud 122 (Figure 16), which is formed with a first enlarged annular portion 124 received in an aperture 126 in the outer end of the lever 112 so as to pivot the lever 112 to the bellcrank 110. The stud is provided with a second enlarged annular portion 128, on which is journaled a cam roller 130, and the stud is further provided with an enlarged head portion 132 retaining the roller 130 and the lever 112 in assembled relation with the bellcrank 110.

The long arm 134 of the bellcrank 110 is provided at its outer end with a slot 136, into which projects the operating pin 138 of a screw feeding assembly head 140, the pin 138 being provided with a sleeve or bushing 142 fitting in the slot 136.

The lever 112 is mounted for endwise or longitudinal movement, as well as angular movement, and for that purpose is provided with a slot 144 receiving a pivot pin 146 carried by the plate 66.

A spring 148 is secured at one end as by pin 150 to the lever 112 and to the other end as by bolt 152 to the stationary block 80. Since the lever 112 is secured to the bellcrank 110 and the cam roller 130 by the stud 122, the spring 148 not only urges the lever 112 to the left, as seen in Figures 4 and 6, but also urges the bellcrank 110 in a clockwise direction, as seen in Figure 4, and the cam roller 130 into engagement with the cam 60.

The cam 60 also operates a lever 154 (Figures 4, 6, 7 and 15 to 17), to which there is secured at one end a cam engaging roller 156, the roller being secured as by a cap screw 158. As will later appear, this lever 154 is mounted by a pivot upon the plate 66 and operates an actuator rod or means 160 (Figures 4 and 14), which actuates a washer severing device or means 162, later to be described. The lever 154 is maintained by gravity in position to be engaged by the cam 60, although it will be evident a supplementing spring may be added, if desired.

The assembly head 140 comprises an actuator rod or plunger 164 (Figures 10 and 11), which carries the operating pin 138. The rod 164 is mounted in a guideway formed by the upstanding plate 66, cover 166 (Figures 4, 13 and 15) and spacing blocks 168 and 170 bolted to or formed with one of these plates. The bar 164 is provided with a groove or slot 172 receiving a cross bar 174 that forms a jaw carrier. A pair of jaw members 176 and 178 are pivoted as by pins 180 and 182 to the cross bar 174. The jaw members 176 and 178 are similarly formed and the construction thereof is best illustrated in Figure 9. As shown in Figure 9, jaw member 178 is generally in the form of a bellcrank having a shank 184, a jaw 186 at one end of the shank, a laterally directed arm 188 forming an operating abutment, and a reduced portion 190 intermediate the arm 188 and the shank 184.

Each jaw 186 is provided with a groove 192. When the jaw members are in closed position, these complementary grooves 192 form a slot to receive the shank of the foremost screw element or blank in the upper portion 18 of the chute 10 (see Figures 1, 2, 6 and 15). The screw receiving slot thus formed in the jaws 186 is open at one end in a direction facing the upper portion 18 of the chute while it is closed at its opposite end, for each of the grooves 192 extends only partially across the jaw 186 so as to form a small abutment 194, preventing movement of the screw elements through the jaws. The reduced portion 190 interfits with a groove in the cross bar 174, as shown in Figure 17, and is apertured to receive the pivot pin 180 or 182. The cross bar 174 is cut away at its outer ends to receive the arms 188 of the jaw members.

The jaw carrier 174 is connected to the bar 164 by springs 196 secured to the opposite ends of the carrier as by pins 198, the springs being secured at their upper ends to a cross bar 200 fastened intermediately as by cap screw 202 to the upper end of the rod 164. The jaw members 176 and 178 are moved to closed position, as the actuator bar 164 and jaw carrier 174 move upwardly, by a pair of spaced blocks 204 and 206, these blocks having beveled inner faces 208 forming operating nose pieces 210 engaging the outer side surfaces of the shanks 184 of the jaw members.

Abutment plates 212 and 214 are adjustably mounted on the blocks 204 and 206 as by screws 216 received in somewhat enlarged openings in these plates, and these plates are positioned in the path of movement of the lateral arms or abutments 188 of the jaw members, so that as the jaw members descend, these abutments 188 engage the abutment plates 212 and 214, as seen in Figure 11, to move the jaws to open position. It should be noted that the outer side surfaces of the jaws are recessed as at 218 (Figures 9 to 11) to receive the nose pieces 210 of the blocks 204 and 206 as the jaws move to open position.

Indexing or pilot means is provided for holding the washer strip against longitudinal movement during the insertion of a screw element in the foremost washer of the strip. This means comprises a pilot plunger 220 slidably mounted in the bore of the block 206. The block 206 is formed with a slot 222 (Figures 11 and 17), through which projects a pin 224 carried by, but extending laterally from, the pilot plunger 220. The pin 224 also passes through a slot 226 (Figure 17) in the upstanding plate 66 and is received in a slot 227 in the outer free end of the lever 112 (Figures 4 and 7). Thus, as the lever 112 pivots about the pin 146 (Figure 4), the pilot plunger is moved downwardly and through the central aperture in a washer of the strip being fed to the assembly station and positioned as shown in Figure 11.

The mounting plate 42 and the overlying plate 70 are slotted as at 228 and 230 to form a guide chute aligned with the upper and lower parts 18 and 20 of the guide chute 10 and in the path of a screw element held in the jaw members 176 and 178, so that, as the assembly head moves downwardly, the shank of the screw element is projected into the slots 228 and 230, as shown in Figure 11.

Washer detecting means 232 (Figures 4, 6 and and 12) serve to prevent feeding of a screw element by the assembly head, if the roll of washers becomes exhausted, or if for any reason the washer is not properly positioned for the reception of the screw element. This means comprises a lever 234 pivoted to the plate 70 as by cap screw 236, around which is coiled a spring 238 bearing at one end against a block 240 integral with or fastened to the plate 70. At its other end this spring 238 bears against an upstanding arm 242 of the lever 234. The lever 234 is formed with a laterally extending platelike portion 244 having a recess 246 in its lower face to receive the edge of the foremost washer of the strip.

The washer overhanging lip formed by the recess 246 serves to prevent tilting of the washer. The upstanding arm 242 is formed with an upper, flat abutment surface 248 and a vertical cam surface 250. The abutment surface 248 normally lies out of the path of the jaw member 176, but should there be no washer at the assembly station, it is moved into the path of this jaw member by the spring 238, as shown in dotted lines in Figure 4, and hence prevents the assembly head from moving downwardly sufficiently to insert the screw element in the slots 228 and 230 of the plates 70 and 66, it being, of course, evident that the jaw members remain in closed position.

The foremost washer of the strip when properly positioned, as shown in Figure 4, causes the cam surface 250 of the lever arm 242 to be positioned for engagement by the outer, lower edge of the jaw member 176, and hence, as the assembly head moves downwardly, the lever 234 is moved in a clockwise direction, as seen in Figure 12, or to the right, as seen in Figures 4 and 11, and out of the path of the jaw member 176. A control device 252 (Figures 4, 7 and 13) provides means for operating the lever 100 to prevent feeding of the washer strip, whenever for any reason a screw element is not fed to the jaw members 176 and 178, and to lock the assembly head against downward movement. This device comprises a combined gear sector and bell crank 254 secured to the pivot pin 182, which is extended outwardly beyond the cross bar 174 and through a slot 256 in the cover plate 166.

A collar 258 (Figure 17) retains the member 254 on the pin 182. This member is operated by a bar 260 formed at its lower end with a rack portion 262, the bar 260 being formed integral with or fastened to the cross bar 200. It will be evident that as the actuator rod or plunger 164 is moved downwardly, the member 254 will be rotated a slight angular distance until the plunger engages the head of the screw positioned in the jaw members 174 and 176. Thereafter, as the jaw carrier 174 and the jaw members are moved downwardly with the plunger 164, the member 254 will move downwardly therewith without further angular movement. However, if a screw element is not positioned between the jaw members, the plunger 164 will move downwardly relative to the jaw members a greater distance, and this greater movement will cause a greater angular movement of the member 254.

The short arm 264 of the member 254 carries at its outer free end a pin 266 having one flattened edge portion 268. Upon substantial rotation of the member 254 the flattened edge portion 268 of the pin will engage a beveled abutment surface or shoulder 270 formed on the plate 166 and prevent further downward movement of the assembly head.

The long arm 272 of the member 254 is provided with an offset outer end portion 274 lying in the plane of the finger 108 of the lever 100. Hence, upon substantial rotation of the member 254, the end portion 274 will engage the finger 108 and move the lever 100 in a counterclockwise direction, as seen in Figure 4. The link is thereby moved upwardly to raise the washer strip feeding lever 82, so that its feed finger or tooth 88 will be maintained out of engagement with the washer strip as the lever 82 swings backwardly and forwardly under the action of the cam 58 and the spring 76.

The washer severing device 162 comprises a block or bar 278 (Figure 14) pivoted as by pin 280 (Figure 12) between the block 240 and the similar block 282 fastened to or formed integrally with the plate 70. The bar 278 is provided with a groove 284 through which the strip of washers passes, so that this bar forms part of the guide for the washer strips. A knifelike bar or severing element 286 is formed over, or fitted above, the groove 284 so as to incline downwardly in the direction of movement of the washer strip. The knifelike bar may be secured to the bar 278 in any convenient or desired manner, or it may, of course, be formed from or cast with the bar 278.

The bar 278 is preferably set into a recess 288 (Figures 4, 9, 11 and 17) in the plate 70, and the forward edge of the knifelike bar 286 is tapered as at 290 to form a shear blade cooperating with the forward edge of the recess 288 to sever the foremost and following washers of the strip at the marginally connecting edge 30. A flat, leaf spring 291, secured in a groove in the plate 70, extends into the groove 284 beneath the knifelike bar 286 and provides a resilient support for the washer strip.

The bar 278 is formed with an outwardly projecting operating lug 292 for engagement with, and actuation by, the actuator device 160. The actuator device 160 comprises a plate 294, as best shown in Figure 14, provided at its lower end with a laterally extending lug 296 for engaging the lug 292 of the bar 278. The plate 294 has a vertically elongated slot 298 which receives the pin 150 (Figures 4 and 17) that is carried by the operating lever 112. By virtue of this pin and slot connection between the lever 112 and plate 194, the lever may move upwardly and downwardly relative to the plate, but the horizontal component of motion of the lever 112 is transmitted to the plate through the pin 150.

The plate 294 is also provided with a small horizontal slot 300 and a large outwardly opening horizontal slot 302. The smaller slot 300 receives a headed stud or cap screw 304 (Figures 4, 7 and 15) threaded into the aperture 306 (Figure 7) in the lever 154. The larger slot 302 receives a headed stud 308 having a first enlarged portion 310 (Figure 7) received in the slot 302, a second smaller annular portion 312 which is received in an aperture 314 of the lever 154 to form a pivot for this lever and a threaded end portion 316 threaded into the upstanding frame plate 66 (Figure 17). Thus, as the lever 154 is swung in a clockwise direction, as seen in Figure 4, the actuator device 160 is pivoted downwardly about the stud 308.

The operation of the machine shown in the drawings is substantially as follows: Screw blanks or elements massed in the hopper 6 (Figure 1) are raised by the feeding mechanism 8 and deposited upon the upper portion 18 of the chute 10. Screw elements which are properly positioned with their heads upon the surface of the chute bars and their shanks between the chute bars gravitate from the hopper and form a line of blanks in the chute, held at their lower end against discharge from the chute by the screw blank positioned in the assembly head, as shown in Figure 15, or by the plunger 164 during the raising or lowering of the assembly head.

As the drive shaft 54 rotates in a clockwise direction, as seen in Figure 4, the cams 58 and 60 permit simultaneous swinging movement of the bellcrank 110 and the lever 62 in a clockwise direction under the action of the springs 148 and 76, respectively. As these levers move in this clockwise direction, the actuator bar or plunger 164 of the assembly head is moved downwardly by the lever 110, and the washer feeding lever 82 is moved to the left or in non-feeding direction by the lever 62. The actuator plunger 164 moves downwardly relative to the jaw carrier 174 and jaw members 176 and 178 until the lower flat edge 318 (Figures 4, 10 and 11) engages the head of the screw element in the jaw members. Thereafter the jaw carrier and jaw members move downwardly with the plunger, thereby to telescope the screw element with the foremost washer of the strip and insert the shank of the screw element in the guide chute formed by the slots 228 and 230 in the plates 42 and 70. As the jaw members approach their lower limit of movement and after the shank of the screw element has been inserted in the washer, the abutments 188 of the jaw members engage the stationary abutments 212 and 214, and the jaw carriers are then moved into open position, as shown in Figure 11, during the slight further downward movement of the jaw carrier. The actuator plunger 164 also continues to move down slightly and pushes the screw from between the open jaw members and causes the head of the screw to abut the washer.

While the assembly head is moving downwardly, the lever 112, as it swings about its pivot pin 146, moves the pilot plunger 220 from the position shown in Figures 4 and 10 to the position shown in Figure 11, in which latter position the pilot plunger has been projected through the central aperture of a washer positioned in the guide groove 284 of the severing device 162. The bar 278 of this severing device is, of course, provided with an opening 320 to permit the pilot plunger to pass therethrough. The longitudinal movement of the lever 112 to the left, as seen in Figure 4, causes the actuator device 160 for the severing device 162 to be moved rectilinearly to the left so as to position its lug 296 above the operating lug 292 of the severing device.

While the assembly head and the pilot plunger are both in lowered position, as shown in Figure 11, and the actuator device is positioned as just stated, a lobe 322 of the cam 60 engages the lever 154 and moves it in a clockwise direction, as seen in Figure 4, about its pivot stud 308. This causes the plate 294 of the actuator device 160 to be tilted or swung in a clockwise direction and thereby effect a depression of the severing device 162. As this severing device is depressed the knifelike bar 286 cooperating with the forward edge of the recess 288 in the plate 70, as best seen in Figure 11, shears the second washer from the foremost washer now telescoped with the screw element.

As the lobe 322 of the cam 60 passes the lever 112 the severing device 162 and its actuator device 160 are raised by a spring 324 (Figure 17) interposed between the plate 70 and the bar 278 and encircling the guide pin or stud 326, and the deflected end of the washer strip returned by spring 291 to the plane of the strip.

Thereafter, the cam 58 swings the lever 62 in a counterclockwise direction, as seen in Figure 4, and the cam 60 swings the lever 110 in a counterclockwise direction, and simultaneously moves the lever 112 longitudinally to the right, the pin 146 in the slot 144 of this lever causing it to swing upwardly while moving to the right. Thus the assembly head and the pilot plunger are returned to their upper limits of movement and the washer feeding lever 82 given a feeding movement to the right, as seen in Figure 4. By reason of the lobe 322 the cam 60 initiates the upward movement of the assembly head and the pilot plunger prior to the initiation of the feeding movement of the lever 82 by the cam 58. Hence, the pilot plunger moves out of the path of the washer strip, and the screw and washer unit just assembled is freed for gravitational movement down the inclined plate 70 before feeding movement is imparted to the washer strip. The actuator device 160 for the severing device 162 is returned to the right, as will be evident, to its initial position, as shown in Figure 4, simultaneously with the upward movement of the pilot plunger 220 by the lever 112.

Whenever the washer roll becomes exhausted and a washer is, therefore, not fed to the assembly station, the washer detector 232 will be moved inwardly by its spring 238 and a feeding of the screw element prevented by the interposition of the arm 242 in the path of the jaw member 176, as previously described. If for any reason, a screw element is not fed to the assembly head, the initial movement of the actuator bar or plunger 164, relative to the jaw carrier and the jaw members, will be greater, and the control device 252 will be rotated, as previously described, so as to lock the assembly head and hold the washer feed lever in raised position against further actuation until this control device has been rotated in the opposite direction by rod 260 as it moves upwardly. While the lever is held in raised position, it is moved in the feeding direction by cam 58, and, when released, its finger 88 is too far advanced to fall into the proper washer aperture so that it passes idly over the washer strip.

The bell crank 254 moves with the cross arm 174, whereas the rack bar 260 moves with the plunger 164 and has a limited movement relative to the cross bar. If a screw is not in position between the jaws, that relative movement is such as to rotate the bell crank 254 sufficiently for the pin 266 to engage the stop or abutment 270 on the fixed plate 166. This stops the further movement of the plunger, the cross bar and the jaws. When the motion of the plunger 164 is thus stopped, the movement of the bell crank 110 inwardly toward the center of its operating cam as the cam surface decreases in radius simply prevents the bell crank from following the surface of the cam. When the larger radial portions of this cam again engage the bell crank 110 the bell crank is moved upwardly to return the plunger 164 to its uppermost position. Thus the operation of the bell crank 254 does not merely lock the cross arm 174 to the plunger 164 but locks the cross arm against further downward movement, and also locks the plunger against further downward movement when the relative motion between the plunger and the cross bar has been taken out.

Changes may be made in the form, construction, and arrangement of the several parts without departing from the spirit of the invention or sacrificing any of its numerous advantages, and the right is hereby reserved to make all such changes as fairly fall within the scope of the following claims.

Having thus described my invention, what I claim as new and desire to secure by Letters Patent is:

1. In a device for assembling screw elements with washers, a pair of screw receiving jaw members, a slide member on which said jaw members are mounted for movement from a screw receiving position to a screw discharging position to insert the screw in a washer at the discharging position, said jaw members being shiftably mounted on said slide member for movement toward each other into closed position to hold the screw, and away from each other to open position to release the screw, a guide for each jaw member situated along the path of movement of said jaw members as they are actuated by said slide member, said jaw members and guide being so constructed that the guide engages, closes, and retains said jaw members in closed position as said slide moves from its screw discharging position to its screw receiving position and back adjacent its screw discharging position, said construction of said jaw members and guide being such that said jaw members, at said screw discharging position, are free to open, means for actuating said slide, and means for moving said jaw members away from each other as they approach the screw discharging position.

2. In a device for assembling screw elements with washers, releasable screw receiving means mounted for movement from a screw receiving to a screw discharging position to insert the screw in a washer located at said discharging position, an operating member engaging the screw in said receiving means to move said screw receiving means from receiving position to discharging position, said member being mounted for movement relative to said screw receiving means when no screw is received therein, and means controlled by said member on movement relative to said screw receiving means for preventing movement of said screw receiving means to discharging position when no screw element is received therein.

3. In a device for assembling screw elements with washers, releasable screw receiving means mounted for movement from a screw receiving to a screw discharging position to insert the screw in a washer located at said discharging position, an operating member mounted for movement relative to the screw receiving means to engage the screw in said receiving means and constructed thereafter to move said screw receiving means from receiving position to discharging position, means for driving said operating member, and latch means including a stationary member, and a shiftable member carried by said screw receiving means, means connecting said operating member to said shiftable member of the latch means to move said shiftable member on movement of the operating member relative to the screw receiving means, said connecting means being constructed to shift the shiftable member of said latch means into engagement with the stationary member to lock the operating member against further movement when a screw element is not positioned in said screw receiving means, said driving means including a yieldable part constructed to permit said operating member to be so latched by said shiftable member of the latching means.

4. In combination, means for intermittently feeding a strip of washers, each connected to the strip by a portion of limited cross section, successively to an assembly location, screw element feeding means constructed and arranged to insert a screw element into a washer as it is fed to said location, means adjacent said location for severing each washer from the strip as it reaches said location and is assembled with a screw element, and actuator means for driving said screw feeding means, said severing means, and said strip feeding means in timed relation to first insert the screw element into a washer, then to sever the washer from the strip, and then move the strip to position another washer at the assembly location for the reception of another screw element.

5. In combination, means for intermittently feeding a strip of washers, each connected by a portion of limited cross section to the strip, to position washers successively at an assembly location, screw element feeding means at an assembly location, screw element feeding means including a feeder at said location constructed and arranged to receive screw elements and to insert said screw elements into the washers as they are fed to said location, means adjacent said location for severing the washers, with which screws are assembled, from the strip, actuator means for driving said screw feeder, said severing means, and said strip feeding means in timed relation to first insert the screw element into a washer, then sever the washer from the strip, and then move the strip to position another washer at the assembly location, and means constructed and arranged to prevent actuation of said screw feeder, said severing means, and said strip feeding means when a screw element is not received by said screw feeder.

6. In a device of the character described, means for rotatably supporting a roll of marginally connected washers, a guide through which the strip of washers passes from the roll, and a device for feeding said strip intermittently from the roll through the guide, said device comprising a pivoted cam follower, a cam operating said follower in one direction, a spring operating the follower in the opposite direction, a lever pivoted to said follower and having a claw interengaging with the washers of the strip in their central apertures to feed the strip of washers upon actuation of the follower by the cam, and means for so mounting said follower and lever as to withdraw the claw from the strip upon actuation of the follower by said spring.

7. In a device for assembling screws and washers, means for feeding a strip of adjoined washers marginally connected to each other along a predetermined path to feed the washers successively to an assembly location, screw element feeding means for inserting a screw element into a washer of the strip at said location to assemble the same, a guide through which the strip of washers passes and emerges at said location, means retarding an assembled washer at said location, means mounting said guide for movement transversely of a retarded washer to sever an unassembled washer of the strip from an adjoined assembled washer, and means for actuating said washer and screw element feed means for feeding washers and inserting screws and for so moving said guide in timed relation to the insertion of a screw element in a washer by said screw element feed means.

8. In a device for assembling screws and washers, means for feeding a strip of washers, each connected by a portion of limited cross section to the strip, along a predetermined path to feed the washers successively to an assembly location, screw element feeding means for inserting a screw element into a washer of the strip at said location to assemble the same, a shearing device adjacent said location and mounted for movement transversely of the strip to sever the washer of the assembled unit from the strip, and means for operating said screw element and washer feeding means and said shearing device in timed relation.

9. In a machine for assembling screw elements and washers, means for rotatably supporting a roller of marginally connected washers, a guide through which a strip of washers passes from the roll, means for intermittently feeding the strip of washers through the guide from the roll and to an assembly location, a screw feeding chute terminating at said location and above the path of said strip, a pair of screw receiving jaws positioned to receive a screw element from the end of said chute, a screw engaging plunger between said jaws, a bar extending transversely of said plunger and having a lost motion connection to said plunger, said screw receiving jaws being pivoted on said bar for movement toward and from each other into a closed position holding the received screw element and into an open position releasing the screw element, means mounting said screw engaging plunger for downward movement relative to said bar to engage a portion of the screw element held in said jaw members and thereby move said jaw members and bar downwardly with said plunger to insert the screw element into a washer positioned at said location, a pilot plunger mounted for movement into interlocking engagement with the strip of washers to hold the strip against movement during insertion of the screw element, a device for severing the washer at said location from the strip after insertion of the screw element therein, and means for operating said screw engaging plunger, said strip feeding means, said pilot plunger and said severing device in timed relation.

10. A machine for making unit assemblies of a screw element and a washer comprising a feed chute for receiving assembled screw element and washer units, means for feeding a strip of washers in a direction transverse to said chute and so constructed as to position the foremost washer of the strip over the chute, screw element feeding means constructed to insert a screw element into each washer positioned over the chute, and means for severing the washer over the chute from the strip after the screw element has been inserted thereinto, said screw element feeding means being constructed to hold the washer and inserted screw element against movement during the operation of said severing means.

11. A machine for making unit assemblies of a screw element and a washer comprising a pair of screw receiving jaw members, a slide member on which said jaw members are mounted for movement from a screw receiving position to a screw discharging position to insert the screw in a washer at the discharging position, said jaw members being shiftably mounted on said slide member for movement toward each other into closed position to hold the screw, and away from each other to open postion to release the screw, spaced guides for said jaw members retaining said jaw members in closed position, except as the jaw members approach the screw discharging position, and moving the jaw members into closed position as they move from the discharging position to the screw receiving position, means for moving said jaw members away from each other as they approach the screw discharging position, means for rotatably supporting a roll of marginally connected washers, a guide through which the strip of washers passes from the roll to an assembly position such that the foremost washer of the strip is located in the path of a screw element as the jaw members move from screw receiving position to screw discharging position whereby to insert the screw in the washer, a device for feeding said washer strip intermittently from the roll through the guide and to said assembly position, said device comprising a pivoted cam follower, a cam operating said follower in one direction, a spring operating the follower in the opposite direction, a lever pivoted to said follower and having a claw interengaging with the washers of the strip in their central apertures to feed the strip of washers upon actuation of the follower by the cam, means for so mounting said follower and lever as to withdraw the claw from the strip upon actuation of the follower by said spring, a second cam, means for operating said cams in synchronism, and means operated by said second cam for moving said slide member in timed relation with the movement of the washer strip to move said jaw members from screw receiving position to screw discharging position between movements of the washer strip.

12. A method of making unit assemblies of a screw and washer comprising, moving step by step to an assembly station a strip of washers, each connected by a portion of limited cross section to the strip, at the assembly station inserting the shank of a screw element into the aperture of the leading washer of the strip, holding the washer in which the shank of the screw has been inserted in its original plane while moving the next following washer transversely out of said plane to sever the one from the other.

13. A method of making unit assemblies of a screw and a washer, comprising moving step by step to an assembly station a strip of washers, each marginally connected by a washer portion of limited cross section to an adjacent washer, at the assembly station and while the strip is at rest inserting a screw element into the leading washer of the strip, holding the screw element and the washer assembled therewith against movement laterally of the strip, and while the assembled elements are thus held applying a shearing force at the point of marginal connection between the washer of the assembled unit and the next following washer whereby to sever the washer of the assembled unit from the strip.

14. A machine for making unit assemblies of a screw and a washer, comprising means for feeding a strip of adjoined washers marginally connected to each other to an assembly station, screw element feeding means for telescoping screw elements into the washers of the strip as they are fed to said station by said strip feeding means, relatively shiftable members engaging the telescoped and untelescoped washers of the strip to sever the former from the latter when said members are relatively shifted, and means for actuating said strip feeding means, said screw element feeding means, and said relatively shiftable members in timed relation.

15. A machine for making unit assemblies of a screw element and a washer, comprising means for feeding a strip of marginally adjoined but otherwise completed washers along a predetermined path, screw element feeding means constructed to successively insert screw elements into the washers of the strip as the washers are fed along said path by said strip feeding means, means constructed to break the washers from each other when the screw elements have been inserted thereinto, and means for actuating said strip feeding means, said screw element feeding means and said breaking means in timed relation.

16. In combination means for rotatably supporting a roll comprising a wound strip of washers marginally connected to each other, an intermittently operated feed device constructed successively to engage the washers of the strip and feed the same from the roll to an assembly location, means for assembling screw elements with the washers as they are fed by said device to said location, means for operating said feed device and assembling means in proper timed relation and means constructed and arranged to prevent said feed device from engaging the washers of the strip whenever the assembly means fails to assemble a screw with a washer.

17. In a device for assembling screw elements and washers, means for intermittently feeding a strip of washers, each connected by a portion of limited cross section to the strip, to feed the washers successively to an assembly location, means for inserting a screw element in each washer of the strip as it is fed to said location, means for holding the strip of washers against movement during the insertion of the screw elements to maintain each washer stationary during insertion of a screw element by said screw element inserting means, means for severing each washer, after assembly with a screw, from the strip, and means for actuating said screw element inserting means, said washer strip holding means and said severing means in timed relation.

18. A machine for making unit assemblies of a threaded fastener and washer, comprising means for feeding a strip of marginally connected washers to an assembly station, means at the assembly station for telescoping the washers with the fasteners, relatively shiftable members engaging the telescoped washer and the next adjacent washer of the strip to support one of the said washers and shift the other washer relative thereto, and means for shifting one of said members relative to the other to sever the marginal connections between washers to detach the telescoped washers from the strip.

19. A machine for making unit assemblies of a screw element and a washer, comprising means for supporting a roll of washers marginally connected in strip form, means for feeding the strip of washers along a predetermined path from a roll on said supporting means, screw element feeding means for inserting screw elements successively in the washers as they are fed in said path to provide screw and washer assemblies, means operatively associated with said washer and screw element feeding means for successively severing the washers of the assemblies from the strip of washers, and means for actuating said washer feeding means, said screw element feeding means and said severing means in timed relation.

OUGLJESA JULES POUPITCH.